(12) United States Patent
Fung (10) Patent No.: US 8,085,274 B2
(45) Date of Patent: Dec. 27, 2011

(54) VIDEO DATA COMPRESSION

(75) Inventor: Hon Chung Fung, Flower Mound, TX (US)

(73) Assignee: VIA Technologies, Inc., Taipei (TW)

( * ) Notice: Subject to any disclaimer, the term of this patent is extended or adjusted under 35 U.S.C. 154(b) by 972 days.

(21) Appl. No.: 11/538,544

(22) Filed: Oct. 4, 2006

(65) Prior Publication Data

US 2008/0018794 A1    Jan. 24, 2008

Related U.S. Application Data

(60) Provisional application No. 60/807,644, filed on Jul. 18, 2006.

(51) Int. Cl.
*G06T 9/00* (2006.01)
*G09G 5/36* (2006.01)
*G06K 9/36* (2006.01)

(52) U.S. Cl. ......... 345/555; 345/556; 345/547; 382/166

(58) Field of Classification Search .................. 345/555, 345/556, 547; 382/166
See application file for complete search history.

(56) References Cited

U.S. PATENT DOCUMENTS

| | | | | |
|---|---|---|---|---|
| 5,142,272 A * | 8/1992 | Kondo | ........................... | 345/550 |
| 5,163,104 A * | 11/1992 | Ghosh et al. | .................. | 382/240 |
| 5,353,061 A * | 10/1994 | Rodriguez et al. | ....... | 375/240.12 |
| 5,467,134 A * | 11/1995 | Laney et al. | ................ | 348/409.1 |
| 5,598,514 A * | 1/1997 | Purcell et al. | ................. | 345/418 |
| 5,926,208 A * | 7/1999 | Noonen et al. | .............. | 348/14.13 |
| 5,943,064 A * | 8/1999 | Hong | .............................. | 345/546 |
| 6,304,339 B1 * | 10/2001 | Miller et al. | .................... | 358/1.9 |
| 6,522,268 B2 * | 2/2003 | Belu | ................................ | 341/51 |
| 2002/0106129 A1 * | 8/2002 | Yadid-Pecht | ................. | 382/232 |
| 2003/0044064 A1 * | 3/2003 | Obrador | ......................... | 382/166 |
| 2003/0112161 A1 * | 6/2003 | Malik | ............................. | 341/51 |
| 2004/0117418 A1 * | 6/2004 | Vainsencher et al. | ......... | 708/402 |
| 2006/0153443 A1 * | 7/2006 | Caruso et al. | ................. | 382/166 |

* cited by examiner

*Primary Examiner* — Xiao M. Wu
*Assistant Examiner* — David T Welch
(74) *Attorney, Agent, or Firm* — Thomas, Kayden, Horstemeyer & Risley, LLP (57) ABSTRACT

Systems and methods for compressing data within a block of data for storage in memory and for transmission along a data path are described herein. By utilizing previously unused bits in data words, the valid data can be stored more efficiently and transmitted in fewer transfer cycles, thereby increasing the availability of the data bus to other masters. One embodiment of a system for storing and transmitting compressed data includes masters and slaves interconnected by a data bus. One of the masters is a video input interface configured to receive video data from an external video source. The video input interface is further configured to compress the video data using a compression algorithm based on the difference in color between two adjacent pixels. Another one of the masters is a video display controller configured to receive the compressed video data. Also, the video display controller is configured to decode the compressed video data to restore the video data to its original form for transmission to an external video display.

15 Claims, 7 Drawing Sheets

| 31-24 | 23-16 | 15-8 | 7-0 |
|---|---|---|---|
| 0xxx_xxxx | R0 | G0 | B0 |

| 31 | 30-26 | 25-21 | 20-16 | 15 | 14-10 | 9-5 | 4-0 |
|---|---|---|---|---|---|---|---|
| 1 | dR2 | dG2 | dB2 | 1 | dR1 | dG1 | dB1 |
| 1 | dR4 | dG4 | dB4 | 1 | dR3 | dG3 | dB3 |
| 1 | dR6 | dG6 | dB6 | 1 | dR5 | dG5 | dB5 |
| 1 | X | X | X | 0 | dR7 | dG7 | dB7 |

| 31-24 | 23-16 | 15-8 | 7-0 |
|---|---|---|---|
| 0xxx_xxxx | R8 | G8 | B8 |

| 31 | 30-26 | 25-21 | 20-16 | 15 | 14-10 | 9-5 | 4-0 |
|---|---|---|---|---|---|---|---|
| 1 | dR10 | dG10 | dB10 | 1 | dR9 | dG9 | dB9 |

FIG. 8

*FIG. 9* to data sorting device 44

5/5:

| 31 | 30 | 29-25 | 24-20 | 19-15 | 14-10 | 9-5 | 4-0 |
|---|---|---|---|---|---|---|---|
| 1 | 1 | dR1 | dG1 | dB1 | dR0 | dG0 | dB0 |

6/4:

| 31 | 30 | 29-24 | 23-18 | 17-12 | 11-8 | 7-4 | 3-0 |
|---|---|---|---|---|---|---|---|
| 1 | 0 | dR3 | dG3 | dB3 | dR2 | dG2 | dB2 |

4/6:

| 31 | 30 | 29-26 | 25-22 | 21-18 | 17-12 | 11-6 | 5-0 |
|---|---|---|---|---|---|---|---|
| 0 | 1 | dR5 | dG5 | dB5 | dR4 | dG4 | dB4 | no compression:

| 31 | 30 | 29-24 | 23-16 | 15-8 | 7-0 |
|---|---|---|---|---|---|
| 0 | 0 | X | R6 | G6 | B6 |

VIDEO DATA COMPRESSION

CROSS REFERENCE TO RELATED APPLICATION

This application claims the benefit of U.S. provisional application Ser. No. 60/807,644, filed Jul. 18, 2006, the contents of which are incorporated by reference herein.

TECHNICAL FIELD

The present disclosure generally relates to a computer system that includes masters and slaves sharing a common data bus and that further includes memory. More particularly, the disclosure relates to systems and methods for compressing video data for more efficient storage in memory and for more efficient transmission along the data bus.

BACKGROUND

Figure 1:
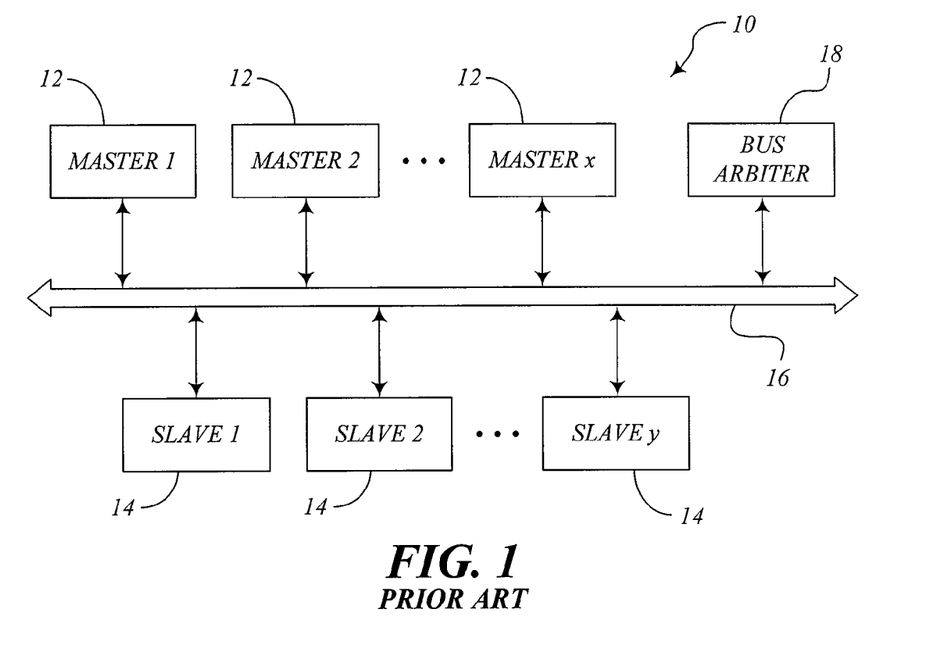
FIG. 1 is a block diagram illustrating a conventional master/slave configuration of an integrated circuit chip.

FIG. 1 is a block diagram of an example of a portion of a conventional integrated circuit (IC) chip 10. The chip 10 includes a number x of masters 12 and a number y of slaves 14, interconnected by a data bus 16. The chip 10 also includes a bus arbiter 18, which receives bus arbitration requests from the masters 12 and allows one master 12 at a time to control the bus 16. When a master 12 is given control of the bus 16, this controlling master 12 may then access any slave 14 as needed.

For example, one of the masters 12 may be an interface designed to receive video data from an external source. The interface may be capable of transmitting the video data to one of the slaves 14, such as a memory controller, which controls the storage of the video data in a "frame buffer" of an external memory device. Also, one of the masters 12 may be a video display controller, which requests access to the video data stored within the frame buffer of the memory device controlled by the memory controller slave 14. The video data is then retrieved by the memory controller and put out onto the data bus 16 for the video display controller. The video display controller then retrieves the video data from the data bus 16 and feeds the video data to an external video display.

It should be noted that a typical memory device is usually organized in data widths of 16 bits (half word) or 32 bits (word). Video data, however, is usually organized in a data width according to the width of the pixel, which may be 16 bits, 18 bits, or 24 bits wide. Each pixel of the video data typically includes the three color components red (R), green (G), and blue (B), which are the three additive primary colors of light. Typically, each color component includes six or eight bits of data to represent that color. In the case where each color component includes six bits, the pixel contains 18 bits total. In the case where each color component includes eight bits, the pixel contains 24 bits total. The 18 or 24 bits of video data for each pixel are stored in the 32-bit format of the memory device. Any unused or "don't care" bits are disregarded by the video display controller.

Figure 2A:
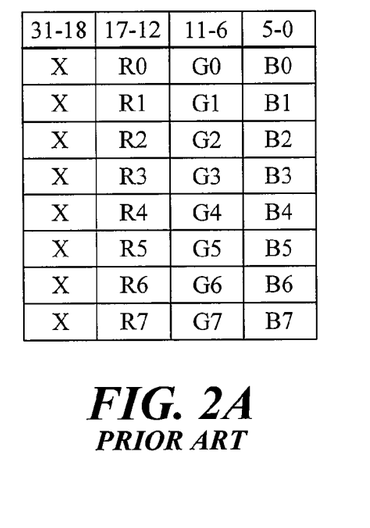
FIGS. 2A and 2B are charts showing the conventional arrangement of pixel data within blocks of video data.

FIG. 2A is a chart showing the arrangement of an eight-pixel block of video data stored in a 32-bit wide memory. In this arrangement, each color component includes six bits, which totals 18 bits for each pixel. For example, bits 17-12 may be used for the red (R) component, bits 11-6 may be used for the green (G) component, and bits 5-0 may be used for the blue (B) component. Bits 31-18 are unused, or don't cares (X's), in this system. The first word illustrates the first pixel (pixel "0") including color components R0, G0, and B0; the second word illustrates the second pixel (pixel "1") including color components R1, G1, and B1; etc.

Figure 2B:
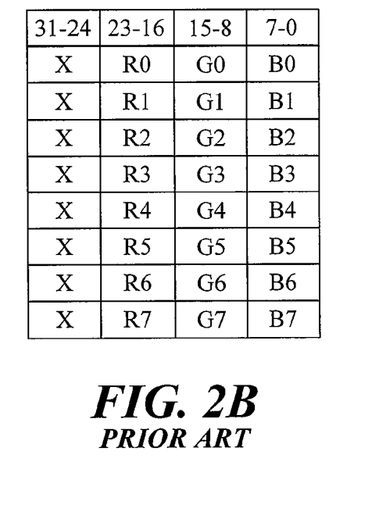

FIG. 2B is a chart showing the arrangement of an eight-pixel block of video data stored in a 32-bit wide memory. In this arrangement, each color component includes eight bits, which totals 24 bits for each pixel. For example, bits 23-16 may be used for the red (R) component, bits 15-8 may be used for the green (G) component, and bits 7-0 may be used for the blue (B) component. Bits 31-24 are unused bits. Although the conventional arrangements shown in FIGS. 2A and 2B represent simple ways to store video data, it can be seen that at least a quarter of the bits in each word are not used.

In addition, as is apparent from these conventional storage techniques, there are many bits that are both stored in memory and transferred along the data bus 16 that are don't cares "X". By minimizing the number of unused bits stored in memory, more storage space can be available for other uses. Furthermore, minimizing unused bits during transmission may also provide greater bus availability for all the bus users, thereby allowing the chip to operate more efficiently at a given speed.

SUMMARY

The present disclosure describes systems and methods for storing data in memory and transmitting data along a data bus. By compressing data in real time from its source, the data can be transferred in fewer clock cycles to memory. As is known, compressed data clearly uses less memory space, thereby saving storage space for other needs. And when the data is requested from memory, the data can be transferred in fewer clock cycles to the requester, thereby increasing the availability of the data bus for other masters sharing the data bus. After transmission of the compressed data, a requesting master can decode the data to restore it to its original format. As an example, the systems and methods discussed herein may be used for the transmission and storage of video data, which normally includes, from its origin, several unused bits per word.

In general, the present disclosure describes a system including a plurality of masters and slaves and a data bus interconnecting the masters and slaves. One of the masters is a video input interface configured to receive video data from an external video source. The video input interface is further configured to compress the video data using a compression algorithm based on the difference in color between two adjacent pixels. Another one of the masters is a video display controller configured to receive the compressed video data. The video display controller is further configured to decode the compressed video data to restore the video data to its original form for transmission to an external video display.

An embodiment of the video input interface described herein, for example, comprises a temporary video storage device, a color change analyzing device, a data sorting device, and a buffer. The temporary video storage device is configured to receive video data from an external source. The color change analyzing device is configured to analyze the change in color from a previous pixel to a current pixel. The data sorting device is configured to determine whether or not values representing the analyzed change in color can be used as compression data. The buffer is configured to store compressed and/or uncompressed video data.

Furthermore, embodiments of a video display controller are described herein in association with the video input interface. The buffer of the video input interface is configured to place the stored data out onto a data bus for a memory controller configured to store the data in an external memory. The memory controller transfers the data from the external memory to a video display controller. The video display controller may be designed to decode the compressed video data according to an algorithm that is complementary to a compression technique used by the data sorting device.

In operation, the systems may utilize certain methods for processing video data. As an example, one embodiment of such a method comprises calculating a value representing the change in color from a previous pixel to a current pixel. The method further includes determining whether the current pixel can be compressed based on the magnitude of the color change. The method may also include selecting the magnitude of the color change as a compressed version of the current pixel when the number of bits used to represent the magnitude does not exceed a predetermined threshold.

Other systems, methods, features, and advantages of the present disclosure will be apparent to one having skill in the art upon examination of the following drawings and detailed description. It is intended that all such additional systems, methods, features, and advantages be included within this description and protected by the accompanying claims.

BRIEF DESCRIPTION OF THE DRAWINGS

Many aspects of the embodiments disclosed herein can be better understood with reference to the following drawings. Like reference numerals designate corresponding parts throughout the several views.

DETAILED DESCRIPTION

The present disclosure describes systems and methods for compressing video data for more efficient storage in memory. With the video data compressed as described herein, the data may also be transmitted along a data bus more efficiently. For example, the systems and methods described herein may be configured within a computer system, particularly an integrated circuit (IC) chip or processor having a commonly shared data bus. Compressing the video data in real time reduces the number of don't care bits, which better utilizes previously unused space in a block of data. As a result, the video data can be stored more efficiently and transferred along the data bus in fewer clock cycles. In this respect, reducing the number of clock cycles can provide greater bus bandwidth for other bus users and can reduce the system's overall consumption of power.

In a computer processing system, the data bus, memory controller, and external memory are common resources shared by the processor and a number of masters and peripheral devices. It is therefore beneficial to optimize the utilization of these common resources by every bus user. Video data is typically stored in memory in a format that naturally does not use every bit location. It would therefore be advantageous to compress the video data in real time in preparation for storage in memory. Also, a compressed block of video data can be transmitted between memory and other masters on the data bus within a fewer number of clock cycles such that the data bus is not occupied as long.

Figure 3:
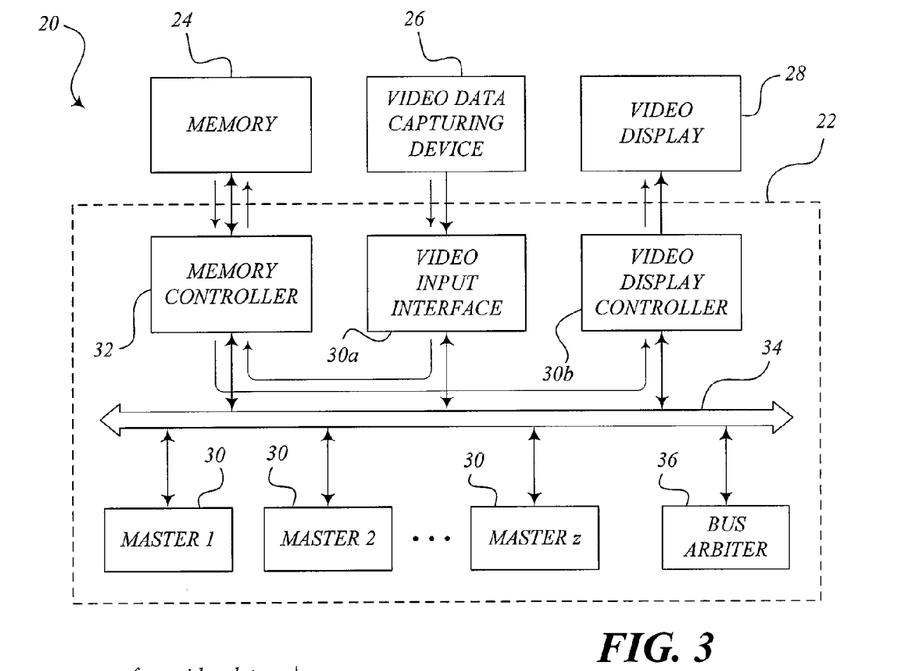
FIG. 3 is a block diagram of an embodiment of a portion of a computer system according to the teachings of the present disclosure.

FIG. 3 is a block diagram of an embodiment of a portion of a computer system 20 according to the teachings of the present disclosure. The computer system 20 includes, among other things, an integrated circuit (IC) chip 22, memory 24, a video data capturing device 26, and a video display 28. The memory 24, for example, may include read-only memory (ROM) and/or random access memory (RAM) and preferably includes dynamic random access memory (DRAM). The memory 24 is external to the chip 22 and is accessed differently from cache memory within the chip 22. The video data capturing device 26 may be a digital camera, CMOS image sensor, or other suitable video source. The video display 28, for example, may be a raster scan device, CRT display, LCD display, or other suitable display device.

The chip 22 includes, among other things, a plurality of masters 30 and a memory controller 32 interconnected by a data bus 34. The chip 22 also includes a bus arbiter 36 connected to the data bus 34 for controlling bus arbitration. Of the masters 30, at least one is a video input interface 30a and at least one is a video display controller 30b. The video input interface 30a receives video data from the video data capturing device 26 and transmits the video data via the data bus 34 to the memory controller 32 for storage in memory 24. Upon request from the video display controller 30b, the memory 24 supplies the video data via the data bus 34. The video display controller 30b receives the video data and may continuously provide the data to the video display 28, which then displays the video to a computer user.

The chip 22 may also include one or more slaves, only one of which is illustrated in FIG. 3, shown here as the memory controller 32. Although only one slave is illustrated in this embodiment, it should be noted that the chip 22 may include any number of slaves. The bus arbiter 36 receives bus requests from the masters 30 and allows one master 30 at a time to control the bus 34. When a master 30 is given control of the bus 34, the controlling master 30 may then access any slave, such as the memory controller 32, as needed.

Normally, video data is stored in a block of memory 24 known as a frame buffer, which can be allocated or stored within a certain portion of the memory 24 using, for example, a unified memory architecture (UMA). The video input interface 30a receives video data from the video data capturing device 26 and compresses the video data utilizing a compression algorithm that does not sacrifice video information. The video input interface 30a then transmits the compressed video data via the data bus 34 to the memory controller 32 for storage in the frame buffer of memory 24. By compressing data within the video input interface 30a, the transmission of data along the data bus 34 can normally be performed in fewer clock cycles than if the data were not compressed.

Then, the video display controller 30b retrieves the compressed video data from memory 24 and decodes the compressed data to restore it to its original form. Then, the video display controller 30b provides the video data to the video display 28 in a constant stream. The video display controller 30b is capable of decoding the compressed video data using an algorithm that is an inverse of the compression algorithm used by the video input interface 30a for restoring the data to its original form, without losing video information, thereby maintaining the original picture quality. Thus, the video input interface 30a and video display controller 30b include complementary circuitry and/or logic for performing the compressing and decoding processes. Details of embodiments of the video input interface 30a and video display controller 30b, along with functionality of data compression and decoding modules, are discussed below.

Figure 4:
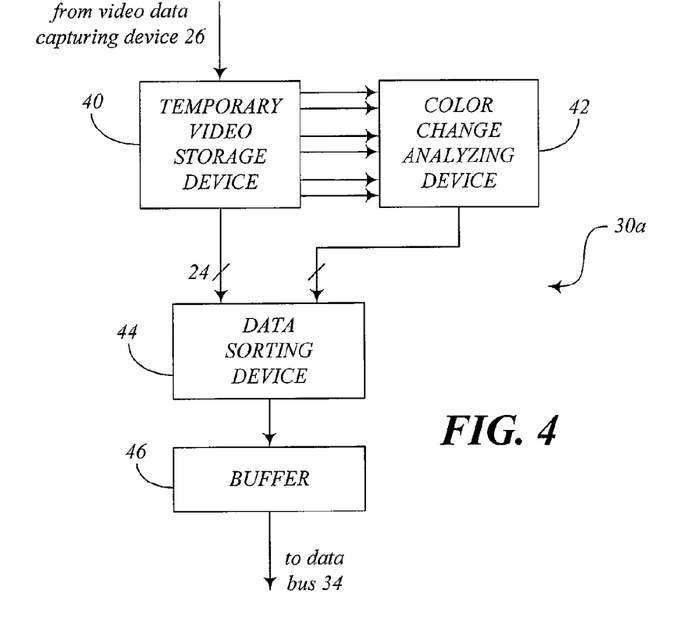
FIG. 4 is a block diagram of an embodiment of the video input interface shown in FIG. 3.

FIG. 4 is a block diagram of an embodiment of the video input interface 30a shown in FIG. 3. In this embodiment, the video input interface 30a generally includes a temporary video storage device 40, a color change analyzing device 42, a data sorting device 44, and a buffer 46. The temporary video storage device 40 receives video data from the video data capturing device 26 and separates each pixel into its corresponding color components, e.g. red (R), green (G), and blue (B). The temporary video storage device 40 stores the data for the current pixel and also stores the data for the previous pixel. In the video frame, the current pixel may be the pixel adjacent to the previous pixel in the same line. In many situations, the current and previous pixels may have substantially similar values. In an alternative embodiment, a line of current pixels may be compared with pixels in an adjacent line. In another embodiment, the pixels of one frame may be compared with pixels in an immediately preceding frame. These alternative embodiments depend primarily on the amount of available storage space for storing pixel data. The temporary video storage device 40 transmits the current and previous color component data to the color change analyzing device 42. Also, the temporary video storage device 40 supplies the uncompressed pixel data for the current pixel, e.g. 24 bits, to the data sorting device 44.

The color change analyzing device 42 receives the current and previous color data and detects the change in value of each color from the previous pixel to the current pixel. In some embodiments, the difference in value for each color is defined by five bits, in which one bit represents the sign (positive or negative) and four bits represent the magnitude of change. The five bits for each color are supplied as a 15-bit color change value to the data sorting device 44. In an alternative embodiment, for example, additional bits may be used to define each color change. Also, the color change analyzing device 42 analyzes whether or not each color difference can be defined by a limited number of bits not exceeding a predetermined threshold value, e.g. five bits or fewer. If not, the color change analyzing device 42 supplies a "threshold" signal to the data sorting device 44 to indicate that at least one color change is too large to allow compression.

In other embodiments, the color change analyzing device 42 may be configured to supply compressed data representing color difference values in which the size of the compressed data is variable. In this respect, the color change analyzing device 42 further supplies coded information to the data sorting device 44 that indicates the particular data size for the respective pixel. By using the data size, the data sorting device 44 can properly pack the data without losing valid information. Accordingly, FIGS. 9-10, described below, illustrate embodiments that allow the flexibility of compressing data to variable sizes.

The data sorting device 44 receives the 24-bit uncompressed video data signal from the temporary video storage device 40. The data sorting device 44 also receives the difference signals representing the color change values and the threshold signal and/or coded information from the color change analyzing device 42. If the threshold signal indicates that the color changes are properly within the bit limit, then the data sorting device 44 can utilize the color change values as the actual data to be stored as compressed video data in the buffer 46. When the data sorting device 44 receives two sequential cycles of compressible data, the two color change values can be stored in one 32-bit word. If the size of the data representing color changes is not within the certain size limit, then the data sorting device 44 utilizes the 24-bit uncompressed data for storage in the buffer 46.

In addition, the data sorting device 44 can add coded bits indicating the compression status of the data being stored. Then, when the amount of video data in the buffer 46 reaches a predetermined level, a block of the compressed video data can be transmitted to the memory controller 32 via the data bus 34. The details of embodiments and operations of the temporary video storage device 40, color change analyzing device 42, and data sorting device 44 of the video input interface 30a are described below with reference to FIGS. 5-7 and 9.

Figure 5:
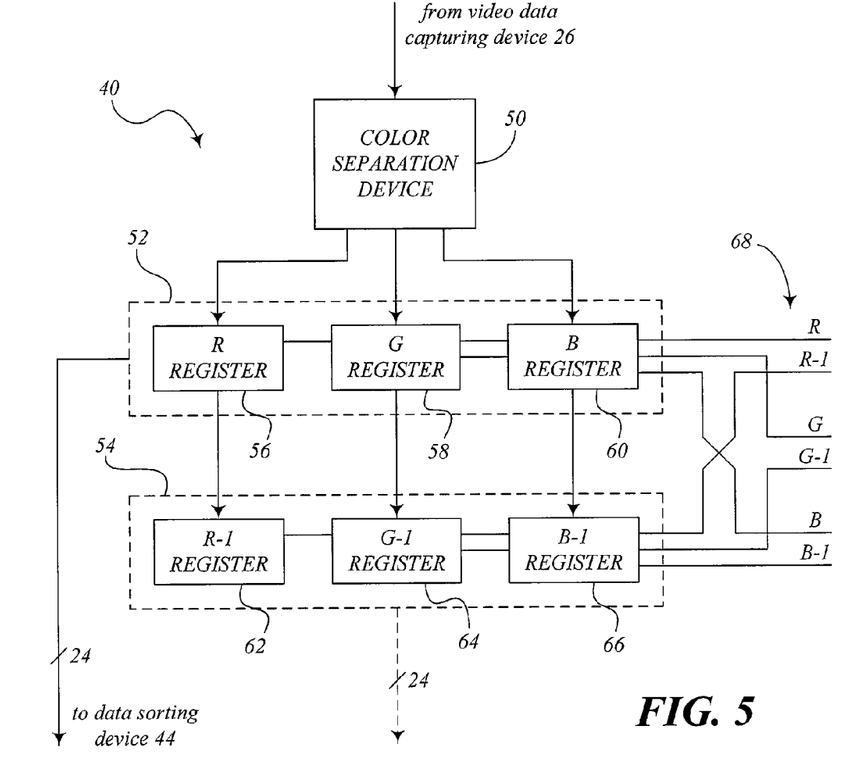
FIG. 5 is a block diagram of an embodiment of the temporary video storage device shown in FIG. 4.

FIG. 5 is a block diagram of an embodiment of the temporary video storage device 40 shown in FIG. 4. In this particular embodiment, the temporary video storage device 40 includes a color separation device 50, a current pixel register 52, and a previous pixel register 54. The current pixel register 52 includes an R register 56 for storing the red color information of the current pixel, a G register 58 for storing the green color information of the current pixel, and a B register 60 for storing the blue color information of the current pixel. The previous pixel register 54 includes an R-1 register 62 for storing the red color information of the previous pixel, a G-1 register 64 for storing the green color information of the previous pixel, and a B-1 register 66 for storing the blue color information of the previous pixel.

The color separation device 50 receives video data from the video data capturing device 26. Then, based on the data width of the incoming video data, the color separation device 50 separates each pixel with respect to color. When the video data is 18 bits wide, as in the case of FIG. 2A, bits 17-12 representing the red component are placed in the R register 56, bits 11-6 are placed in the G register 58, and bits 5-0 are placed in the B register 60. When the video data is 24 bits wide, as in the case of FIG. 2B, bits 23-16 are placed in the R register 56, bits 15-8 are placed in the G register 58, and bits 7-0 are placed in the B register 60. Thus, registers 56, 58, and 60 are configured to be able to store at least eight bits. In this embodiment, the current pixel information in the current pixel register 52 is output along a 24-bit path to the data sorting device 44. Although several examples herein refer to an original video data width of 24 bits, it should be recognized that certain modifications can be made to the present disclose to accommodate other widths.

The registers 56, 58, and 60 may be configured as shift registers to shift current pixel information from the current pixel register 52 into the previous pixel register 54 when new current pixel information is received. In this way, the previous pixel register 52 stores the pixel information previously stored in the current pixel register 52. Data may be shifted, for instance, when new pixel data is received or in response to a clock signal. In an alternative embodiment, the 24 bits of pixel information held in the previous pixel register 54 may also be transmitted to the data sorting device 44 for utilization thereby. The values held in each of the registers 56, 58, 60, 62, 64, and 66 are output along lines 68 to the color change analyzing device 42.

Figure 6:
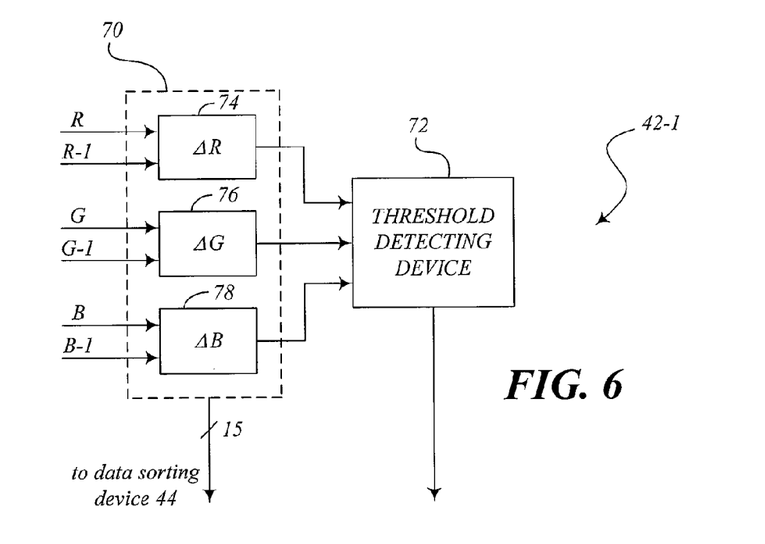
FIG. 6 is a block diagram of a first embodiment of the color change analyzing device shown in FIG. 4.

FIG. 6 is a block diagram of a first embodiment of the color change analyzing device 42 shown in FIG. 4. In general, the color change analyzing device 42-1 in this embodiment includes a color delta calculating device 70 and a threshold detecting device 72. The color delta calculating device 70 includes a red delta calculator 74, a green delta calculator 76, and a blue delta calculator 78. Each delta calculator 74, 76, and 78 receives the color value for the current pixel (R, G, B) and the color value for the previous pixel (R-1, G-1, B-1), respectively, and calculates the difference between the values, recording the sign (positive or negative) and the magnitude of the difference. In some embodiments, each delta calculator 74, 76, and 78 is configured to hold only five bits. If the delta value is higher than five bits, then an overflow bit or carry bit may be sent to the threshold detecting device 72, which determines if any of the deltas exceed five bits. Alternatively, the delta calculators 74, 76, and 78 may be configured with the capacity to store a value representing the highest possible change in color values, i.e. from no color to full color, or vice versa.

Five bits from each delta calculator 74, 76, and 78 are output along the 15-bit line to the data sorting device 44. If the delta calculators are configured to store more than five bits each, then only one sign bit and the four least significant magnitude bits are transferred to the data sorting device 44. Also, the delta calculators 74, 76, and 78 may transmit at least one bit to the threshold detecting device 72. If the delta calculators are capable of handling five bits each, then a single bit may be sent to the threshold detecting device 72. As mentioned above, the single bit may be an overflow or carry bit. Alternatively, the delta calculators may be further configured to send any suitable type of indication bit indicating whether or not the delta exceeded the 5-bit limit. In the embodiment where each delta calculator 74, 76, and 78 is capable of handling a maximum delta value, the delta calculators may transmit the entire delta value to the threshold detecting device 72. Regardless of these or other embodiments that may be conceived from an understanding of the present disclosure, the threshold detecting device 72 is capable of receiving information to determine whether or not a delta value for one or more color components exceeds the five-bit limit. If any delta is greater than five bits, then compression in this case will not normally be attempted for the current pixel. However, in the embodiment of FIG. 9, the color change analyzing device 42 is capable of handling situations where the deltas may exceed five bits, as explained in more detail below.

Referring again to FIG. 6, after determining whether or not the delta values exceed the limit, the threshold detecting device 72 sends a one-bit "threshold" signal to the data sorting device 44 indicating whether or not to compress the current pixel. For example, the threshold detecting device 72 may send a logic "0" signal when the data is not to be compressed and a logic "1" signal when the data is to be compressed. The threshold detecting device 72 may comprise any suitable combination and configuration of logic elements to generate and provide this threshold signal.

Figure 7:
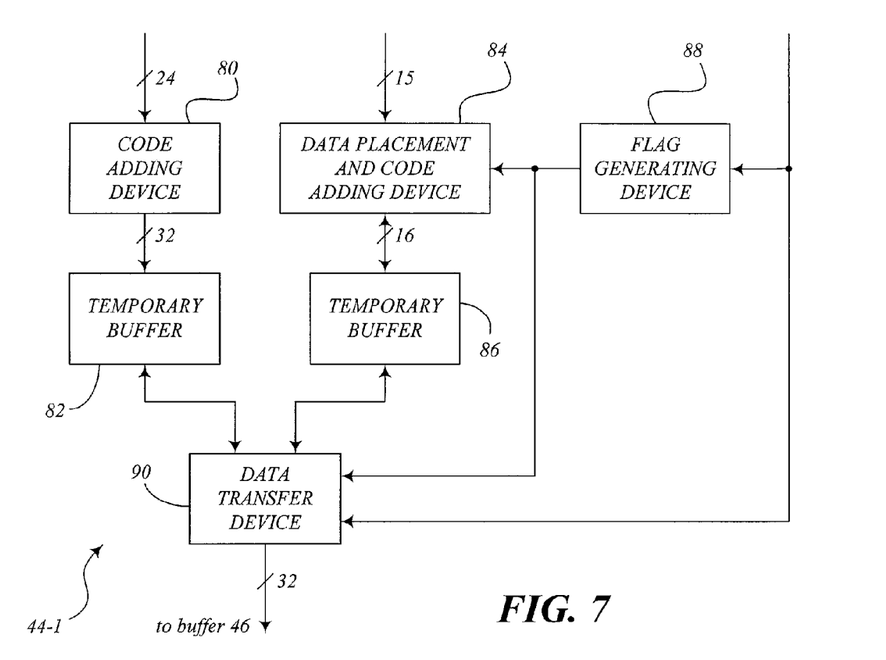
FIG. 7 is a block diagram of a first embodiment of the data sorting device shown in FIG. 4, operating in conjunction with the color change analyzing device of FIG. 6.

FIG. 7 is a block diagram of an embodiment of the data sorting device 44 shown in FIG. 4. The data sorting device 44-1 in this embodiment is configured to operate, for example, in conjunction with the embodiment of the color change analyzing device 42-1 of FIG. 6. The data sorting device 44-1 receives the 24-bit signal from the temporary video storage device 40 representing the uncompressed pixel information for the current pixel. Alternatively, the uncompressed pixel information may be received directly from the video data capturing device 26. The data sorting device 44-1 also receives the 15-bit signal and threshold signal from the color change analyzing device 42-1. The 15-bit signal represents the three five-bit deltas for each color delta calculation.

According to the embodiment of FIG. 7, the data sorting device 44-1 includes a code adding device 80 and a first temporary buffer 82 in a first branch. The data sorting device 44-1 includes a data placement/code adding device 84 and a second temporary buffer 86 in a second branch. The data sorting device 44 also includes a flag generating device 88 and a data transfer device 90. In the first branch, the code adding device 80 receives the 24-bit uncompressed pixel data and applies a specific code value to one or more bit locations indicating that this pixel data is not compressed. The code adding device 80 creates a 32-bit word having 24 bits of valid data representing the uncompressed pixel data and the one or more coded bits. The remaining bits are don't cares and can be disregarded. In this example, one bit, e.g. a logic "0", is the coded bit placed in bit location 31 to indicate that the pixel information is not compressed. This 32-bit word is then stored in the first temporary buffer 82.

The flag generating device 88 receives the threshold signal from the threshold detecting device 72. In response, the flag generating device 88 generates a flag signal that indicates to the data placement/code adding device 84 where two consecutive compressed signals are to be stored in a 32-bit word. For example, the flag signal may indicate that a first group of compressible pixel data is to be stored in the 15 lower bit positions 14-0 of the word and a second group of compressible pixel data is to be stored in the 15 upper bit positions 30-16 of the word. This configuration may be reversed if desired. In this example, the flag generating device 88 resets to zero. Then, in response to the threshold signal as indicated above where "0" denotes no compression and "1" denotes compression, the flag generating device 88 generates a flag signal as follows: When the threshold signal is a "0", the flag signal is reset to "0" on the next cycle. When the threshold signal is a "1", the flag signal is toggled on the next cycle.

According to the above logic with respect to the threshold signal and flag signal, the data placement/code adding device 84 operates as follows with respect to the second branch: The data placement/code adding device 84 receives the 15-bit delta signal representing the color changes from the previous pixel to the current pixel. This delta signal is the actual compressed signal used in the present disclosure and does not necessarily require additional processing, except as specifically mentioned herein. In conjunction with the temporary buffer 86, the data placement/code adding device 84 places the compressed signal (delta signal) in either the upper 16 bits or lower 16 bits of a 32-bit word held in the temporary buffer 86. In addition, the data placement/code adding device 84 adds two coded bits indicating the compression status.

When the flag signal is "0", this is an indication that the temporary buffer 86 does not contain valid data. In this case, the compressed signal can be stored in the lower 15 bits of the temporary buffer 86 and a coded bit value of "1" is stored in bit position 31. When the flag signal is "1", this is an indication that the temporary buffer 86 is partially filled and already has valid data in the lower bit positions 14-0, i.e. stored there when the flag signal is "0". The next 15-bit compressed signal is then stored in bit positions 30-16 and a coded bit value of "1" is stored in bit position 15, indicating that the upper bits are valid. If the contents of the temporary buffer 86 are stored off with only the lower bits valid, a code value of "0" is stored in bit position 15, indicating that the upper bits are not valid. In this respect, if bit positions 31 and 15 are "11", then both upper and lower groups of bits are valid. For value "10", only the lower bits are valid. With regard to the code adding device 80 in the first branch, since a "0" is inserted in bit position 31 to indicate uncompressed data, the bit position 15 contains valid data but is a don't care when interpreted for the sake of identifying compression status. Also, with a "0" in bit position 31 indicating an uncompressible pixel, the contents of the temporary buffer 86 may be discarded or reset since the data therein is invalid.

Although the flag signal and threshold signal are described herein using specific values of "0" or "1", it should be noted that the values may be switched without departing from the spirit and scope of the present disclosure. Also, the specific bit locations described herein are arbitrary and may be changed to any suitable arrangement as desired. Again, such modifications do not depart from the spirit and scope of this disclosure.

The first and second temporary buffers 82 and 86 hold the uncompressed and compressed versions of the current pixel information, respectively. Temporary buffer 86 may also hold the previous compressed pixel information when two consecutive compressible pixels are stored therein. The data transfer device 90 accesses the buffers 82 and 86 according to the threshold and flag signals and supplies the relevant data to the buffer 46. In operation, the data transfer device 90 transfers data according to the following description.

When the flag signal is "0" and the threshold signal is "0", meaning that the temporary buffer 86 does not contain valid information from a previous pixel and the current pixel is not to be compressed, then the data transfer device 90 accesses the uncompressed data from temporary buffer 82 and transmits this data to the buffer 46 for storage. When the flag signal is "0" and the threshold signal is "1", meaning that the temporary buffer 86 does not contain valid information from a previous pixel and the current pixel is to be compressed, then the data placement/code adding device 84 places a first group of compressed pixel data for the current pixel in the temporary buffer 86 in anticipation of filling the remaining bits with a second consecutive group, if this too is compressible. In this situation, however, the data transfer device 90 does not send any data to the buffer 46.

When the flag signal is a "1" and the threshold signal is a "0", meaning that the temporary buffer 86 contains valid information from a previous pixel and the current pixel is not to be compressed, then the data transfer device 90 accesses the partially filled word in the temporary buffer 86 and sends this data to the buffer 46. Then, the data transfer device 90 also sends the current uncompressed word from the temporary buffer 82 to buffer 46. In this case, two transfers are made. In an alternative embodiment, the data transfer device 90 may be configured to receive the optional 24-bit signal representing the previous pixel information from the previous pixel register 54 shown in FIG. 5. In this alternative case, when the flag and threshold signals are 1 and 0, respectively, the data transfer device 90 can simply transmit this uncompressed version of the previous pixel instead of sending the partially filled word from temporary buffer 86.

When the flag signal is a "1" and the threshold signal is a "1", meaning that the temporary buffer 86 contains valid information from a previous pixel and the current pixel is to be compressed, then the data transfer device 90 waits for the data placement/code adding device 84 to place the current compressed data with the previous compressed data in the word stored in the temporary buffer 86. Then, the data transfer device 90 accesses the fully filled compressed word in the temporary buffer 86 and sends this data to the buffer 46.

Figure 8:
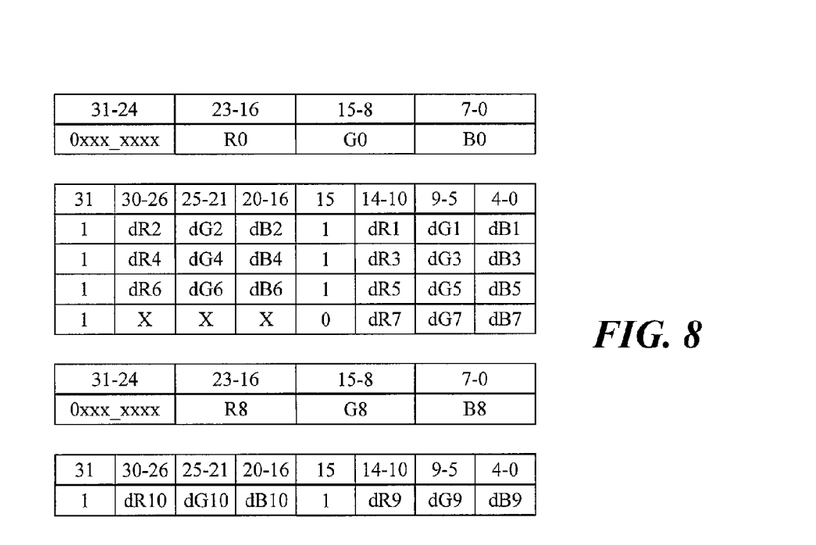
FIG. 8 is a chart illustrating an example of video data compressed according to possible compression techniques utilizing the embodiments of FIGS. 5-7.

FIG. 8 is a chart illustrating an example of a possible arrangement of video data compressed according to a compression algorithm according to the present disclosure. Instead of allowing the video data to remain in its original format as shown in FIGS. 2A and 2B, the video input interface 30a compresses the video data to utilize more of the unused space. In these arrangements, the video data can be transferred along the data bus 34 more efficiently and stored in memory 24 more efficiently.

The chart of FIG. 8 shows an example of pixel information for a block of video data containing eleven pixels (pixels 0 through 10). In this example, some pixels are uncompressed and others are compressed. The notation R0, for example, represents the uncompressed red component of pixel 0. The notation dR2, for example, represents the compressed signal defined by the delta (or difference) value for the red component of pixel 2 with respect to the previous red value in pixel 1. In this example, the threshold signal is reset to 0 for the first pixel of a block of video data. Thus, the first pixel will not be compressed since there would be no reference pixel to which deltas can be compared. Pixel 0 therefore is uncompressed and the coded bit value of "0" in position 31 indicates that the pixel is not compressed.

Pixels 1 and 2 in this example both have deltas less than five bits, which therefore allows compression of these pixels. As can be seen in this example, two consecutive compressible pixels are used to form a fully filled compressed word. As illustrated, pixels 3 and 4 are compressed and placed together in a word, pixels 5 and 6 are compressed and placed together in a word, and pixels 9 and 10 are compressed and placed together in a word.

Also in this example, it can be seen that pixel 7 has been compressed and placed in lower bit positions 14-0, where dR7 is in positions 14-10, dG7 is in positions 9-5, and dB7 is in positions 4-0. However, since pixel 8 might not be compressible according to this embodiment, the partially filled compressed word containing compressed pixel 7 may be transmitted to buffer 46 while the upper bits are don't cares. Bit 31 is a "1" to indicate that the lower positions (14-0) are valid, but bit 15 is "0" since the upper positions (30-16) are not valid. As suggested above, the data transfer device 90 may alternatively receive pixel 7 in its uncompressed state and store this pixel without compression.

It can be seen in this example that four words are fully filled compressed words. Therefore, instead of requiring the original video data to be stored in memory occupying eleven words and transferred along the data bus in eleven transfer cycles, the data can be stored in seven words and transferred in seven cycles, resulting in about a 36% reduction in transfer time and storage space.

Figure 9:
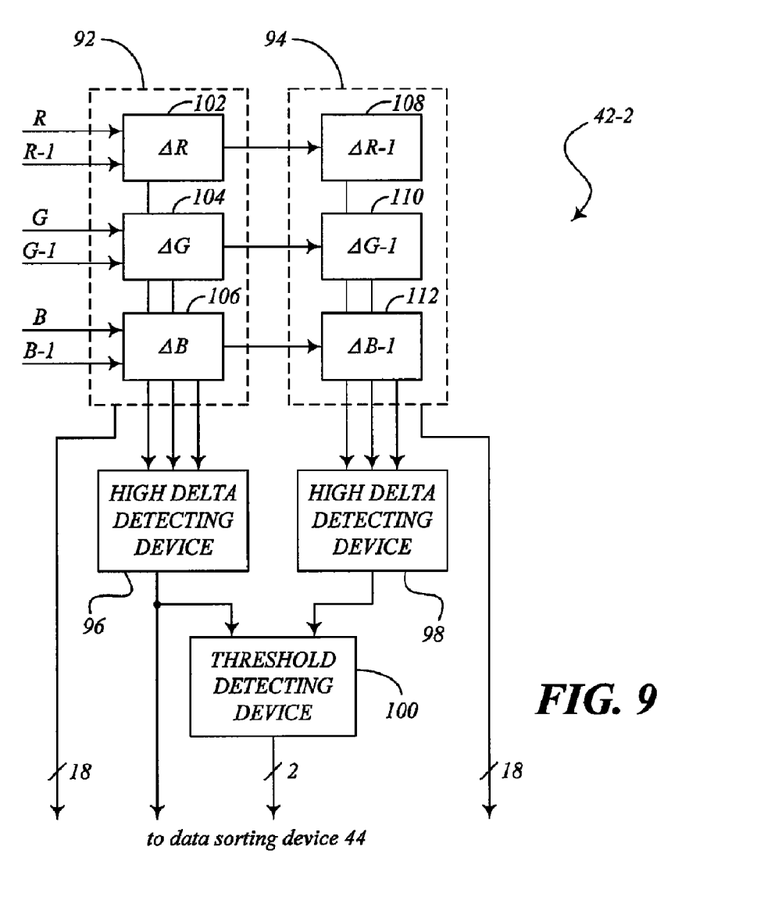
FIG. 9 is a block diagram of a second embodiment of the color change analyzing device shown in FIG. 4.

FIG. 9 is a block diagram of a second embodiment of the color change analyzing device 42 shown in FIG. 4. In this embodiment, the color change analyzing device 42-2 includes a color delta calculating device 92 and a previous color delta register 94. In addition, the color change analyzing device 42-2 includes a first high delta detecting device 96, a second high delta detecting device 98, and a threshold detecting device 100. The color delta calculating device 92, like the color delta calculating device 70 shown in the embodiment of FIG. 6, includes a red delta calculator 102, a green delta calculator 104, and a blue delta calculator 106. The previous color delta register 94 includes a previous red delta register 108, a previous green delta register 110, and a previous blue delta register 112, each for temporarily storing the previous color changes.

Each delta calculator 102, 104, and 106 of the color delta calculating device 92 receives the color value for the current pixel (R, G, B) and the color value for the previous pixel (R-1, G-1, B-1) and calculates the difference between the values, recording the sign (positive or negative) and the magnitude of the difference. In one particular configuration with respect to FIG. 9, each delta calculator 102, 104, and 106 is configured to calculate and hold a value representing the highest possible change in color values, i.e. from no color to full color, or vice versa. The values for the changes in color are transmitted to the first high delta detecting device 96. Alternatively, the delta calculators 102, 104, and 106 may be configured to be capable of storing up to six bits. In this case, if the delta value is higher than six bits, then an overflow bit or carry bit may be sent to the threshold detecting device 100, which can determine if any of the deltas exceeds six bits.

Up to six bits from each delta calculator 102, 104, and 106 are output along the 18-bit line to the data sorting device 44. In embodiments where the delta calculators are configured to store more than six bits each, then only one sign bit and the five least significant magnitude bits for each color are transferred to the data sorting device 44. Also, the delta calculators 102, 104, and 106 may transmit at least one bit to the first high delta detecting device 96 indicating the number of bits necessary to represent the respective color change. If desired, the delta calculators 102, 104, and 106 may transmit the entire delta values to the first high delta detecting device 96. Regardless of these or other embodiments that may be conceived from an understanding of the present disclosure, the first high delta detecting device 96 is capable of receiving information to determine the highest delta value of the three color changes from the delta calculators 102, 104, and 106. The first high delta detecting device 96 can also detect whether or not a delta value for one or more color components exceed the six-bit limit. If any delta is greater than six bits, then compression in this embodiment will not normally be attempted. The high delta detecting device 96 transmits the highest determined delta value or a signal indicating the number of bits needed to define the highest delta value to the threshold detecting device 100.

The high delta detecting device 96 receives the information concerning the number of bits necessary to represent each color change and determines which color of the current pixel experiences the highest change. If at least one color exceeds the six-bit limit, the high delta detecting device 96 informs the threshold detecting device 100 that compression is not to be performed for the current pixel. The high delta detecting device 96 sends a signal indicative of the value of the highest color delta.

The delta calculators 102, 104, and 106 may also be configured as shift registers to shift the values of color deltas to the corresponding delta registers 108, 110, and 112 of the previous color delta register 94. Also, the second high delta detecting device 98 may operate similarly to the first delta detecting device 96 to detect the highest color change for the group of color changes of the previous color delta register 94. Alternatively, instead of the high delta values for the previous pixel being calculated by the second high delta detecting device 98, the first high delta detecting device 96 may simply shift this information into the second high delta detecting device 98 in parallel with the shifted color delta information. The second high delta detecting device 98, according to these or other embodiments, sends the highest delta value of the previous color deltas to the threshold detecting device 100.

When the threshold detecting device 100 receives the highest delta values for the current color deltas and the previous color deltas, it then determines whether or not the sum of the two highest values is greater than ten. If so, then the color changes are too great for these two consecutive pixels to be stored in a 32-bit word. However, if the sum is ten or less, it may be possible to store the two consecutive pixels in one word according to their deltas. Preferably, with this embodiment, the highest delta for a group of colors in a pixel sets the number of bits used for each color delta in that group. Therefore, if the highest delta requires six bits, then each color delta for that pixel is defined by six bits. The resulting combinations of deltas for consecutive pixels is thus four bits for each color delta of the first pixel and six bits for each color delta of the second pixel, or five bits for the first pixel and five bits for the second, or six bits for the first and four for the second. The notation for these arrangements is described herein by 4/6, 5/5, and 6/4, respectively. In these arrangements, the total number of bits for the two consecutive pixels is 30, allowing two coded bits to be used to indicate the compression status.

Figure 10:
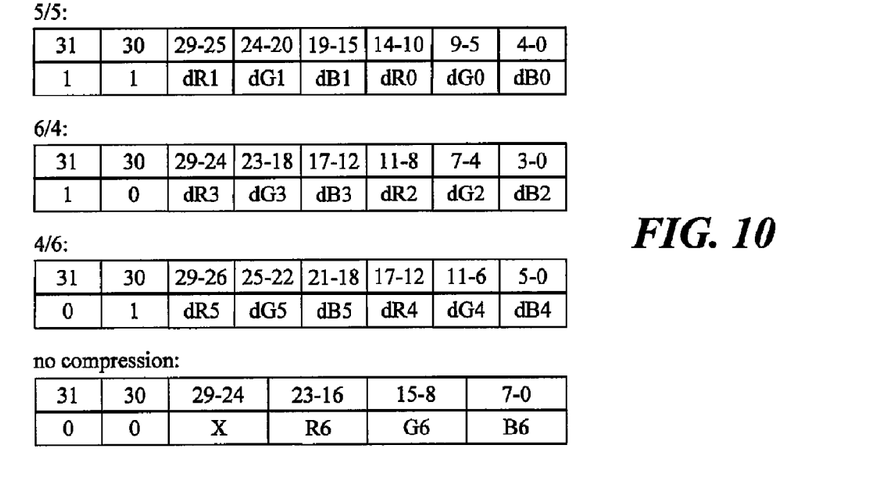
FIG. 10 is a chart illustrating an example of video data compressed according to possible compression techniques utilizing the embodiment of FIG. 9.

FIG. 10 is a chart illustrating an example of pixel information for a block of video data containing seven pixels (pixels 0 through 6). In this example, the three compression arrangements and one uncompressed arrangement are shown. The first arrangement includes a 5/5 bit allocation where the color changes for the first pixel (pixel 0) are defined by five bits for each color and the color changes for the second pixel are also defined by five bits for each color. In the 6/4 bit allocation, the color changes for pixel 2 are defined by four bits for each color and the color changes for pixel 3 are defined by six bits for each color. In the 4/6 bit allocation, the color changes for pixel 4 are defined by six bits and the color changes for pixel 5 are defined by four bits. Bit locations 31 and 30 are used this embodiment to store a two-bit allocation code sent by the threshold detecting device 100. In this case, "11" indicates the 5/5 allocation, "10" indicates the 6/4 allocation, and "01" indicates the 4/6 allocation. In addition, allocation code is "00" represents no compression as in the case for pixel 6. In this case, bit positions 29-24 are don't cares.

Figure 11:
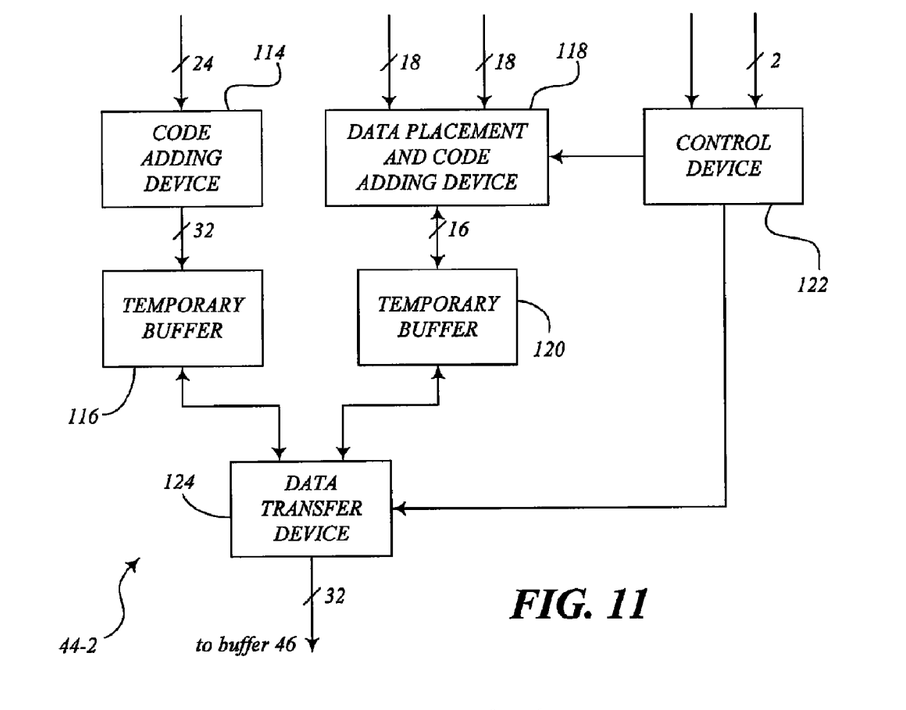
FIG. 11 is a block diagram of a second embodiment of the data sorting device shown in FIG. 4, operating in conjunction with the color change analyzing device of FIG. 9.

FIG. 11 is a block diagram of another embodiment of the data sorting device 44 shown in FIG. 4. The data sorting device 44-2 in this embodiment is configured to operate, for example, in conjunction with the embodiment of the color change analyzing device 42-2 of FIG. 9. The data sorting device 44-2 receives the 24-bit signal from the temporary video storage device 40 representing the uncompressed pixel information for the current pixel. Alternatively, the uncompressed pixel information may be received directly from the video data capturing device 26. The data sorting device 44-2 also receives the 18-bit signals, threshold signal, and 2-bit allocation code from the color change analyzing device 42-2. The 18-bit signals represent the three delta values for up to six bits for each color delta calculation. If only four or five bits are needed to fully express the delta values, then the 18-bit signals may include less than 18 valid values.

The data sorting device 44-2 includes a code adding device 114 and a first temporary buffer 116 in a first branch. The data sorting device 44-2 includes a data placement/code adding device 118 and a second temporary buffer 120 in a second branch. The data sorting device 44 also includes a control device 122 and a data transfer device 124. In the first branch, the code adding device 114 receives the 24-bit uncompressed pixel data and applies a specific code value to one or more bit locations indicating that this pixel data is not compressed. The code adding device 114 creates a 32-bit word having 24 bits of valid data representing the uncompressed pixel data and the two or more coded bits. The remaining bits are don't cares and can be disregarded. In this example, value "00" is the coded bit pattern placed in bit locations 31 and 30 to indicate that the pixel information is not compressed. This 32-bit word is then stored in the first temporary buffer 116.

The control device 122 receives the threshold signal from the high delta detecting device 96 and the 2-bit allocation code from the threshold detecting device 100. In response, the control device 122 generates a coded signal that indicates to the data placement/code adding device 118 where two consecutive compressed signals are to be stored in a 32-bit word. The coded signal also indicates the size of each compressed signal to allow the data placement and code adding device 188 to properly place the compressed signals within the word. For example, the coded signal may indicate that a first group of compressible pixel data is 18 bits and is to be stored in the 18 bit positions 17-0 of the word and a second group of compressible pixel data is 12 bits and is to be stored in the 12 bit positions 29-18 of the word. This configuration may be reversed if desired. In this example, the control device 122 may reset to zero, similarly to the flag generating device 88 shown in FIG. 7. Furthermore, the control device 122 may also respond to the threshold signal to control the placement of two adjacent pixels depending on whether either or both are compressible. The data placement and code adding device 118 places the compressed data within the word in a substantially similar manner as explained with respect to the description of FIG. 7.

The first and second temporary buffers 116 and 120 hold the uncompressed and compressed versions of the current pixel information, respectively. Temporary buffer 120 may also hold the previous compressed pixel information when two consecutive compressible pixels are stored therein. The data transfer device 124 accesses the buffers 116 and 120 according to control signals from the control device 122 and supplies the relevant data to the buffer 46. For example, the control device 122 may instruct the data transfer device 124 to transfer data in a manner substantially similar to the description with respect to the flag signals and threshold signals described with respect to FIG. 7. The control device 122 may take into account whether or not the temporary buffer 120 contains valid information from a previous pixel or current pixel. The control device 122 may also take into account whether or not the previous pixel or current pixel are compressed, and with what compression allocation they are compressed. The control device 122 may also take into account whether the data transfer device transmits zero, one, or two valid words to the buffer 46.

With reference again to FIG. 9, an alternative embodiment is described allowing even greater compression. Additional previous color delta registers 94 may be used in this alternative embodiment to store a larger array of color changes. In this case, additional high delta detecting devices may also be used to correspond with each additional previous color delta register. Also, the threshold detecting device 100 may receive a plurality of high delta values for each column of the array. The threshold detecting device 100 sums the color deltas to determine a variable allocation scheme. If the sum is fewer than an available number of bits in a word, the color deltas for more than two consecutive pixels may be combined in one 32-bit word, thereby compressing the video data even further. For example, the highest deltas of consecutive pixels may be represented according to the following arrangements, including, for example, 2/2/5, 2/5/2, 5/2/2, 2/3/4, 2/4/3, 3/2/4, 3/4/2, 4/2/3, 4/3/2, 3/3/3, 2/2/2/3, 2/2/3/2, 2/3/2/2, or 3/2/2/2, where each sum is nine or less. With 27 bits used to define color deltas for the three colors in this example, five additional bits may be available as code bits to define 25 (32) possible compression arrangements. Other compression schemes may be used if desired to further compress the video data.

In other embodiments of the present disclosure, the color change analyzing device 42 may compare each pixel with predetermined pixel values, instead of comparing with an adjacent pixel. For example, the color change analyzing device 42 may choose a reference pixel having an average value of the colors, and each pixel is compared with the reference pixel to find the deltas. Accordingly, the video display controller 30b can restore the video data by adding the deltas to the reference pixel. Yet in other embodiments of the present disclosure, the video data can be separated into black/white or gray levels, depending on the construction of the video data.

Figure 12:
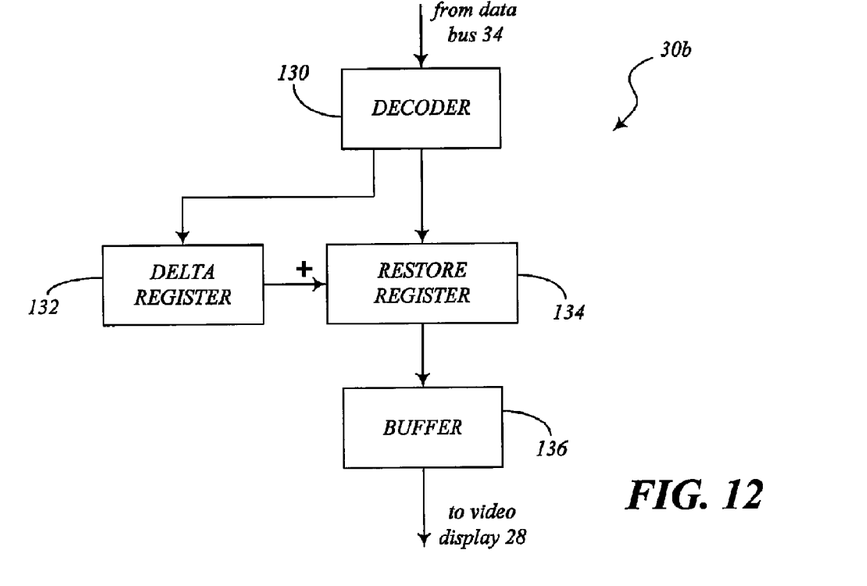
FIG. 12 is a block diagram of an embodiment of the video display controller shown in FIG. 3.

FIG. 12 is a block diagram of an embodiment of the video display controller 30b shown in FIG. 3. This embodiment, and other suitable embodiments that may be conceived from an understanding of the present disclosure, are meant to be used in cooperation with a device that compresses data according to a predefined compression algorithm, such as the algorithms or processes of the video input interface 30a described herein. In this embodiment, the video display controller 30b includes a decoder 130, a delta register 132, a restore register 134, and a buffer 136.

The decoder 130 receives the compressed video data from the data bus 34 and decodes the data. First, the decoder 130 analyzes the code bit(s) to determine whether or not the data is compressed. With respect to the embodiments of FIGS. 4-7, the decoder 130 may look at the code bits in positions 31 and 15. If these bits are "0X", then the word is not compressed. If these bits are "10", then only the bits in positions 14-0 are valid, representing the partially filled word containing the compressed data for one pixel. If these bits are "11", then two pixels are compressed in the word, where locations 14-0 store the first compressed pixel and locations 30-26 store the second compressed pixel. With respect to the embodiment of FIG. 9, the decoder 130 analyzes bits 31 and 30 to determine the compression arrangement selected for the pixel. With respect to an alternative embodiment of FIG. 9 where five bits are used to denote the compression status and bit positions 26-0 are valid data, the decoder 130 may analyze bit positions 31-27.

When the code bit(s) indicate an uncompressed word, the decoder 130 transmits the uncompressed data to the restore register 134. The restore register 134 holds the word and also transfers this data to the buffer 136 for storage. If the code bit(s) indicated a fully compressed or partially compressed word, the decoder 130 transmits the delta values to the delta register 132. If fully compressed (two pixels compressed), the delta registers 122 stores each pixel's delta values in order. Also, the delta register 132 transmits the delta values to the restore register 134 where the delta values are added to the previous pixel, thereby restoring the video data to its original form. Then the restore register 134 transmits the restored data to the buffer 136. If a word contains two compressed pixels, the process of adding to the restore register 134 is repeated, once for each set of deltas. The buffer 136 can then supply the restored video data to the video display 28 in a normal continuous stream.

The video display 28 sees the video data the way it is originally captured by the video data capturing device 26. In this respect, the video display 28 does not need to be re-designed. Although the data is restored by the video display controller 30b, during transfer of this video data along the data bus 34 and during storage in memory 24, the format of the video data is changed by compression algorithms performed by the video input interface 30a. The video input interface 30a compresses the video data to reduce the size whereby no valid data is lost. In this way, the compressed video data can be stored using less memory space and transmitted along the data bus 34 in fewer cycles. The video display controller 30b then converts the compressed video data back into its original form using a decoding algorithm that is the inverse of the compression algorithm of the video input interface 30a.

The video input interface 30a and video display controller 30b of the present disclosure can be implemented in hardware, software, firmware, or a combination thereof. In the disclosed embodiments, any of the corresponding elements of these devices may be implemented, at least in part, in software or firmware that is stored in memory and that is executed by a suitable instruction execution system. Alternatively, this logic can be implemented in hardware with any combination of suitable components, such as discrete logical circuitry having gates for implementing logic functions, an application specific integrated circuit (ASIC), etc.

Figure 13:
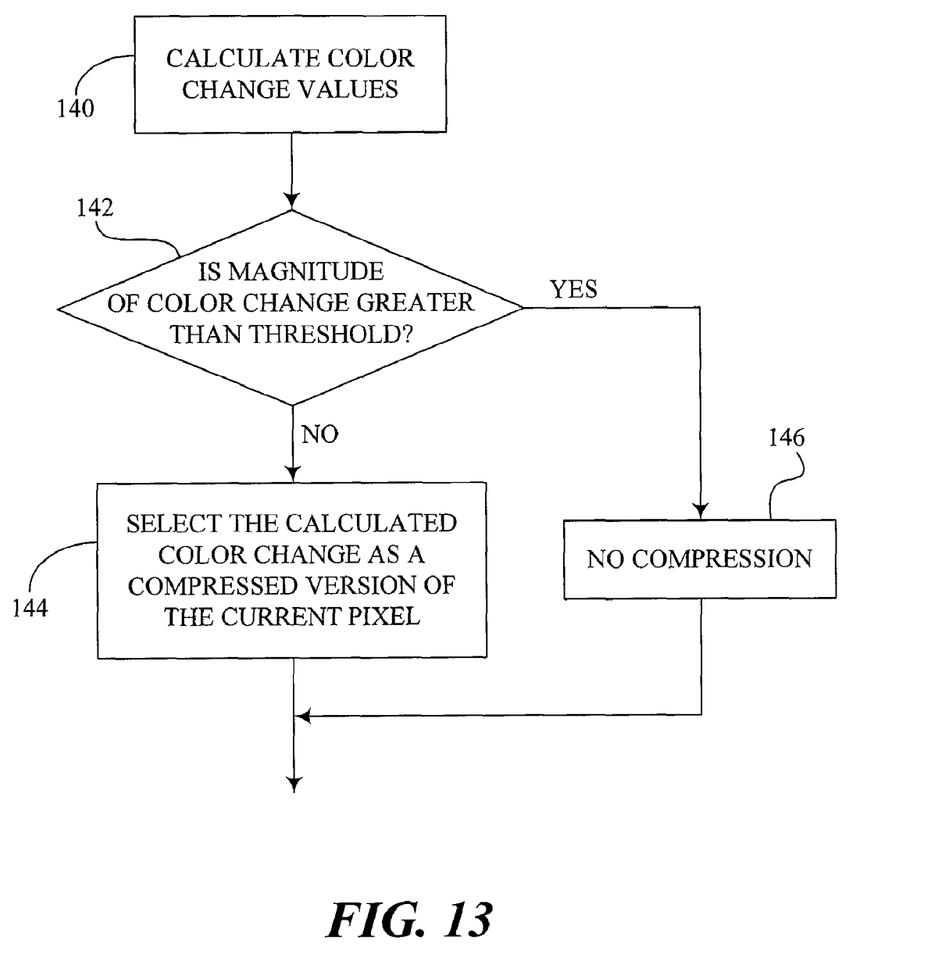
FIG. 13 is a flow chart illustrating an embodiment of a method for processing video data.

FIG. 13 is a flow chart illustrating an embodiment of a method for processing video data. In block 140, the values for the changes of color from a preceding pixel to the current pixel are calculated. The values may represent the changes of color with respect to the red, green, and blue components of color. In decision block 142, it is determined whether or not the magnitude of the color change is greater than a predetermined threshold. For example, the number of bits used to represent the magnitude may be analyzed to determined if the magnitude exceeds the threshold. If it is determined in block 142 that the magnitude is not greater than the threshold, indicating a relatively small color change, then the flow proceeds to block 144. If the magnitude is greater than the threshold, then flow proceeds to block 146. In block 144, the color change calculated in block 140 is selected as a compressed version for the current pixel. In block 146, when the color change is greater than the threshold, no compression based on color change values is used. In this case, an uncompressed version of the current pixel is selected.

The method of operation of the video input interface 30a and video display controller 30b may include any suitable architecture, functionality, and/or operation of various implementations of processing software. In this regard, each function may be a module, segment, or portion of code, which comprises one or more executable instructions for implementing the specified logical functions. It should also be noted that in some alternative implementations, the functions may occur out of the specified order or executed substantially concurrently.

It should be emphasized that the above-described embodiments are merely examples of possible implementations. Many variations and modifications may be made to the above-described embodiments without departing from the concepts, principles, and teachings of the present disclosure. All such modifications and variations are intended to be included herein within the scope of this disclosure and protected by the following claims.

I claim:

1. A system comprising:
a video input interface configured to receive video data having a pixel sequence from an external video source, the video input interface further configured to compress the video data using a compression algorithm based on the difference in color between two adjacent pixels in the pixel sequence, wherein the compression algorithm separately compresses each of a plurality of color values for each pixel with respect to each of three primary colors to generate compressed video data, wherein the video input interface is further configured to group consecutive pixels determined to be compressible based on the color difference into a fully compressed word;
wherein the compression algorithm of the video input interface compresses two or more adjacent pixels, each of which is originally stored in a data word, into one fully compressed data word only when the difference between each pair of the two adjacent pixels does not exceed a predetermined threshold, and does not compress the two or more adjacent pixels when the difference between each pair of two adjacent pixels exceeds the predetermined threshold; and
a video display controller configured to receive the compressed video data, the video display controller further configured to decode the compressed video data for transmission to an external video display.

2. The system of claim 1, further comprising a memory controller configured to receive the compressed video data from the video input interface via a data bus for storage in an external memory, the memory controller further configured to transmit the compressed video data from the external memory to the video display controller via the data bus.

3. The system of claim 2, further comprising a bus arbiter configured to arbitrate control of the data bus to one of the video input interface, video display controller, and memory controller.

4. The system of claim 1, wherein the compression algorithm further applies a code value to at least one bit within the data word signifying whether the data word is compressed and signifying the correspondence of bit locations in the compressed data word to the original pixels.

5. The system of claim 4, wherein the video display controller is further configured to decode the compressed video data according to the code value within the compressed data word.

6. The system of claim 1, wherein the video input interface further generates a threshold signal indicating whether the pixel is compressed.

7. The system of claim 1, wherein the video input interface and video display controller are embodied on an integrated circuit chip and incorporated into a computer system, and wherein the external video source is a CMOS image sensor, the video display controller is an LCD controller, and the video display is an LCD display.

8. A method for processing video data, the method comprising:
receiving video data having a pixel sequence from a memory;
calculating a value representing the change in each of three primary colors from a first pixel to a second pixel in the video data;
determining whether to compress the second pixel based on the magnitude of the change;
selecting the magnitude of the change as a compressed version of each color value of the second pixel only if the magnitude of change is less than a predetermined value, and not compressing the second pixel if the magnitude of change exceeds the predetermined value; and
forming fully filled compressed words based on whether two consecutive pixels are compressed by compressing two or more adjacent pixels, each of which is originally stored in data word, into one fully compressed data word only when the difference between each pair of the two adjacent pixels does not exceed a predetermined threshold, and not compressing the two or more adjacent pixels when the difference between each pair of two adjacent pixels exceeds the predetermined threshold.

9. The method of claim 8, wherein selecting the compressed version further comprises compressing two or more adjacent changes into a data word.

10. The method of claim 9, wherein selecting the compressed version further comprises applying a code value within the data word signifying that the data word contains a compressed version of the corresponding pixels.

11. The method of claim 8, further comprising:
selecting an uncompressed version of the second pixel when a number of bits exceeds the predetermined threshold.

12. The method of claim 11, wherein selecting the uncompressed version further comprises applying at least one bit within the second pixel signifying that the second pixel is not compressed.

13. The method of claim 11, further comprising:
transmitting the compressed and uncompressed video data to a memory controller via a data bus for storage in a memory;
transmitting the stored compressed and uncompressed video data from the memory to a video display controller via the data bus; and
decoding the compressed video data by the video display controller.

14. A method for compressing a pixel sequence, the method comprising:
receiving a first pixel and a second pixel, each of the first and second pixels comprising three color values with respect to three primary colors components;
calculating color differences in color values respectively between the first pixel and the second pixel;
selecting a magnitude of the color difference as a compressed version of a color value only when the color difference is less than a predetermined threshold with respect to each color component;
forming fully filled compressed words based on whether two consecutive pixels are compressible by compressing two or more adjacent pixels, each of which is originally stored in data word, into one fully compressed data word only when the difference between each pair of the two adjacent pixels does not exceed a predetermined threshold, and not compressing the two or more adjacent pixels when the difference between each pair of two adjacent pixels exceeds the predetermined threshold; and
storing or transmitting the fully filled compressed words as a compressed pixel sequence.

15. The method of claim 14, further comprising:
selecting the received color value as a compressed version of a color value in response to the color difference not being less than the predetermined threshold.

* * * * *